Feb. 20, 1934.  L. C. BROECKER  1,948,466
VALVE PARTS ASSEMBLING MACHINE
Filed July 16, 1930  9 Sheets-Sheet 1

INVENTOR
LEWIS C. BROECKER.
BY
Ely &Barrow
ATTORNEYS

Feb. 20, 1934.  L. C. BROECKER  1,948,466
VALVE PARTS ASSEMBLING MACHINE
Filed July 16, 1930  9 Sheets-Sheet 2

INVENTOR
LEWIS C. BROECKER,
BY
Ely & Barrow
ATTORNEYS.

Feb. 20, 1934.  L. C. BROECKER  1,948,466
VALVE PARTS ASSEMBLING MACHINE
Filed July 16, 1930    9 Sheets-Sheet 4

INVENTOR
LEWIS C. BROECKER,
BY
Ely & Burrow
ATTORNEYS.

Patented Feb. 20, 1934

1,948,466

UNITED STATES PATENT OFFICE 1,948,466

VALVE PARTS ASSEMBLING MACHINE

Lewis C. Broecker, Bridgeport, Conn., assignor to The Firestone Steel Products Company, Akron, Ohio, a corporation of Ohio Application July 16, 1930. Serial No. 468,304

20 Claims. (Cl. 29—33)

This invention relates to automatic apparatus for assembling the various parts of pneumatic tire or inner tube valves.

The general object of the invention resides in the provision of relatively inexpensive, fool-proof and efficient apparatus for uniformly, rapidly and effectively assembling tire valve parts.

The above and other objects of the invention are achieved by the apparatus illustrated in the accompanying drawings and described below, it being understood that the invention is not limited to the exact details thereof shown and described.

Referring to the drawings the numeral 21 indicates the frame of any standard punch press upon the bolster plate 22 of which is rotatably supported a dial 23. Carried on the upper portion of the frame 21 is the usual motor 24 which through gearing 25 and 26 reciprocates crank arm 27 pivotally secured to a punch plate 28 slidably gibbed as at 31 to the frame 21.

Figure 1:
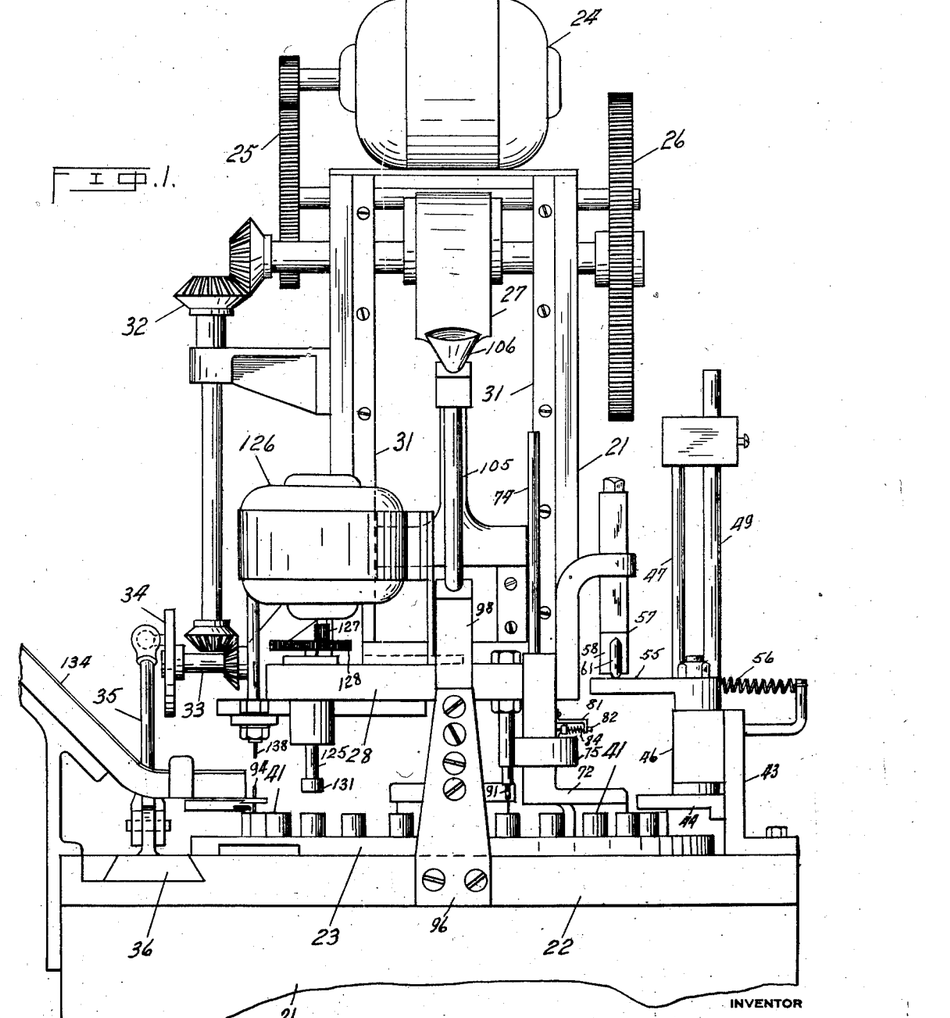
Figure 1 is a front elevation of the apparatus embodying the invention.
Figure 2:
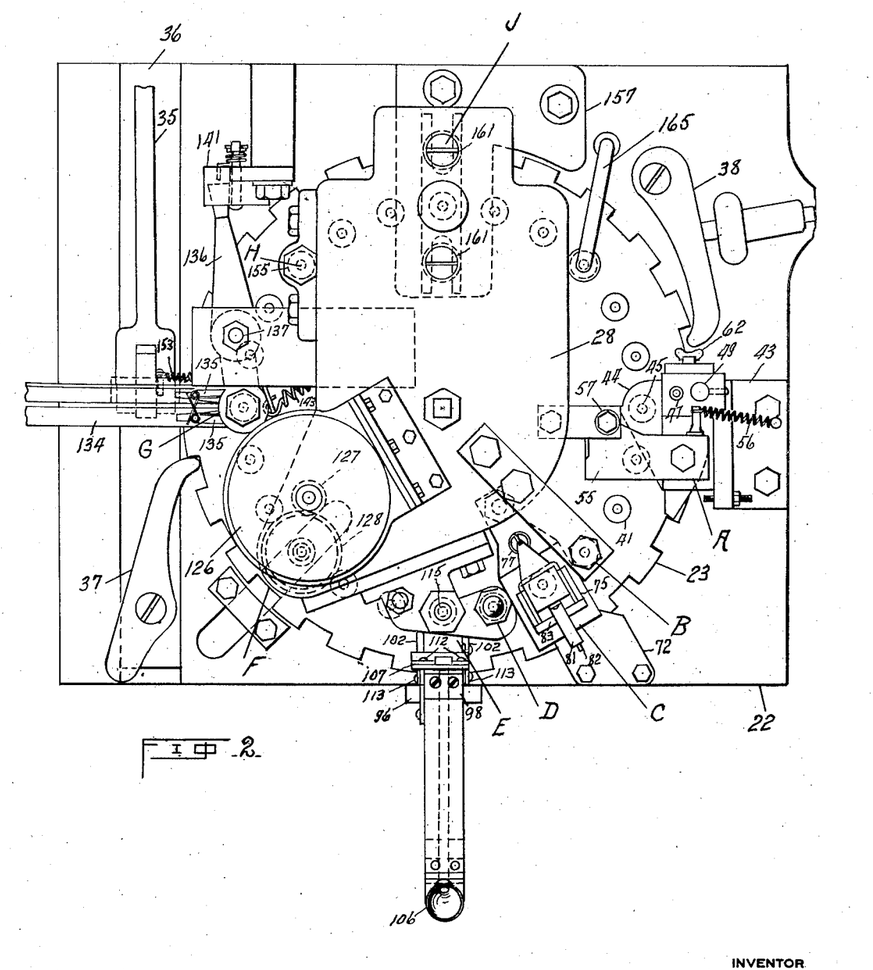
Figure 2 is a plan view of the apparatus embodying the invention.

The motor 24 also serves to periodically step or index the dial 23 and for this purpose apparatus may be provided including bevel gearing 32 driving a horizontal shaft 33 which through crank 34 and link 35 reciprocates a slide 36 gibbed in the bolster plate (Figure 2) which acting through dog 37 will step the dial as will be apparent. A stop-dog 38 engages the dial to prevent retractive movement thereof during the return stroke of slide 36.

The dial 23 is provided with a circumferential series of axially recessed bushings 41 spaced apart a distance equal to the periodic stepping or indexing of the table.

At station A (see Figures 3, 4 and 5) the foot 42 of the valve insides is fed into the bushing. To this end a bracket 43 is secured to the bolster plate which bracket carries a plate 44 extending out over the path of the bushings so that a funnel hole 45 in said plate will be in line with a bushing after each indexing of the dial.

Figures 3, 4, 5, 6:
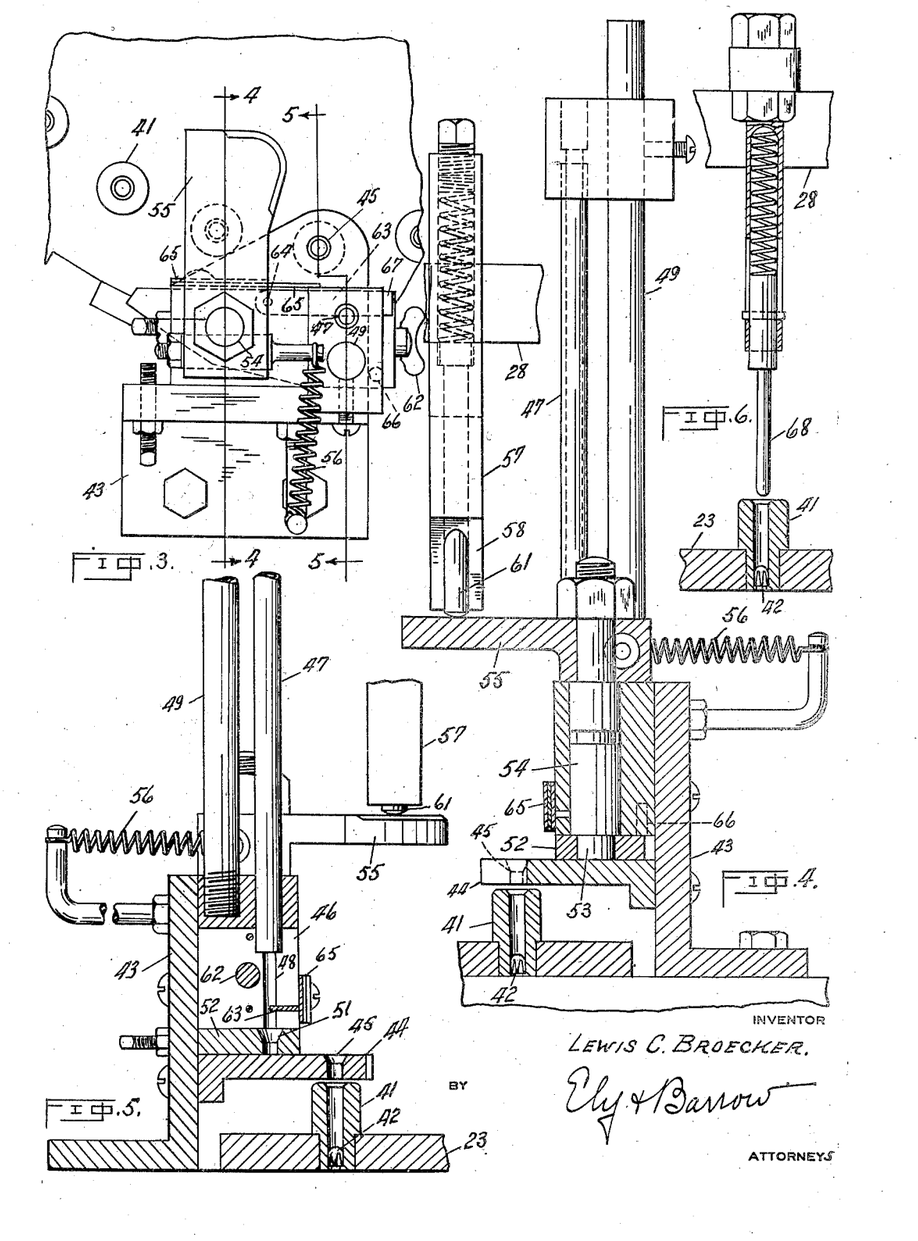
Figure 3 is a plan view of the foot feed unit labeled station A.
Figure 4 is a sectional view on line 4—4 of Figure 3 with the punch plate carried cam for operating the same shown.
Figure 5 is a sectional view on line 5—5 of Figure 3.
Figure 6 is a sectional elevation of the foot plunger unit labeled station B.

The bracket 43 also carries a split block 46 supporting a vertical tube 47 strengthened by a support pipe 49, said tube containing a plurality of stacked feet 42. The feet are adapted to be fed by gravity from the tube 47 down through a vertically extending hole 48 in the block 46 to a funnel hole 51 in a transfer plate 52. The transfer plate 52 is secured as at 53 to a vertically extending shaft 54 journaled in the block 46 to the top of which shaft is fixed a cam follower 55.

The cam follower 55 and transfer plate 52 are normally held in the retarded or loading position by a tension spring 56 but are adapted to be moved to the discharging position above the bushing by a cam 57 having a vertically angular face 58, said cam being secured to the punch plate 28. A resiliently mounted pin 61 is provided in conjunction with the cam 57 which pin extends from the cam face 58 thereof.

The block 46 is split so that if the feet become jammed in passing through the vertical hole 48 therein a thumb screw 62 holding the split portions together can be removed allowing the jammed feet to be straightened. In order to properly feed the feet a knife 63 is provided which is pivoted at 64 in a suitable slot in the block 46. The knife 63 is normally held in the hole 48 as shown in Figure 5 by a spring 65 but is adapted to be moved out of the hole 48 about its pivot 64 by the engagement of a pin 66 on the transfer plate 52 with the extending end 67 of the knife.

Means are preferably provided at station B, see Figure 6, to insure that the foot 42 is pushed to the bottom of the bushing hole and for this purpose a resiliently positioned plunger 68 is mounted on the punch plate 28.

Figure 7:
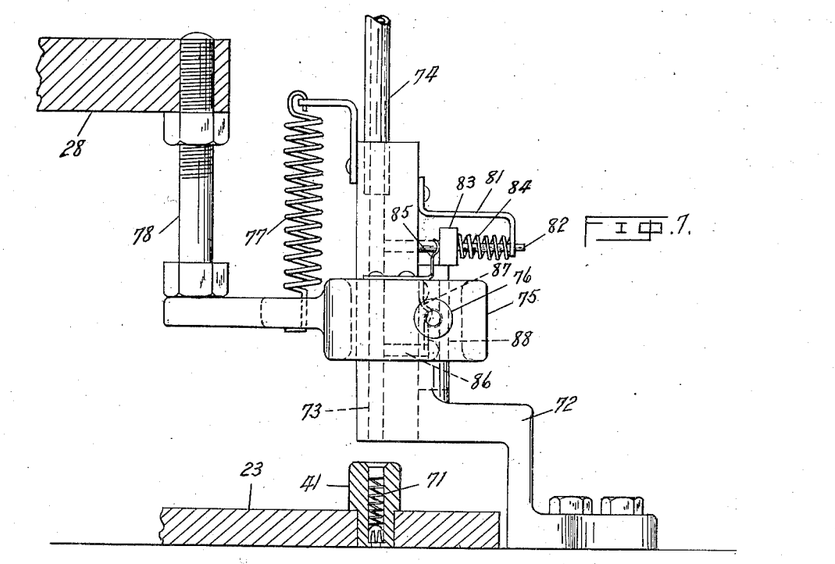
Figure 7 is a side elevation of the spring feed unit labeled station C.
Figures 8, 9:
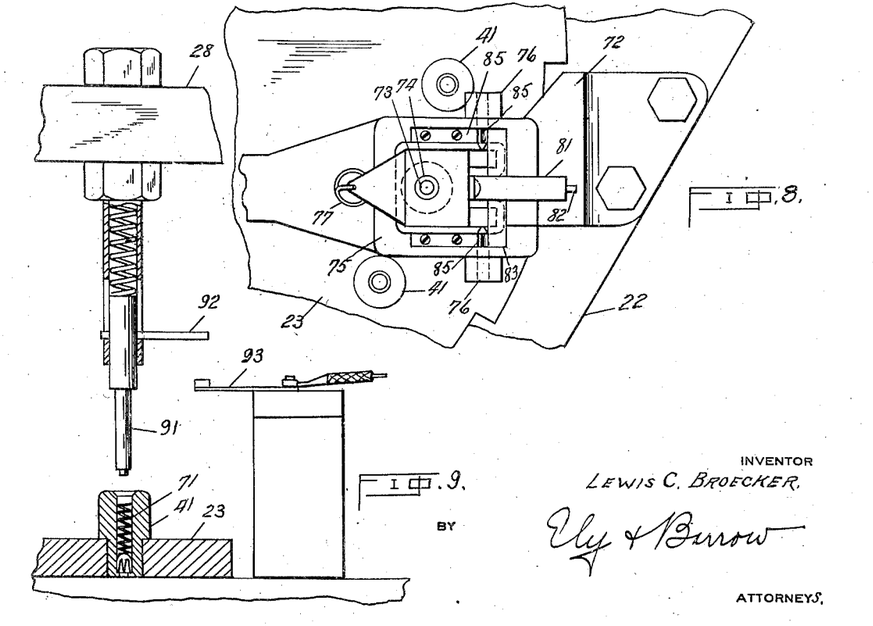
Figure 8 is a plan view of Figure 7.
Figure 9 is a sectional elevation of the spring pusher or feeler unit labeled station D.

The spring of the valve insides, which is indicated by the numeral 71, is fed into the bushing 41 on top of the foot 42 at station C. For this purpose a bracket 72 may be provided which is secured to the bolster plate 22 and which extends out over the dial 23 so that a vertical hole 73 in the bracket will be in alignment with a bushing 41 at each periodic rest of the dial. Adapted to removably fit in the top of the bracket 72 in alignment with the hole 73 is a magazine 74 which carries a plurality of springs. In order to feed the springs 71 one at a time to the bushing 41 a yoke 75 is pivotally secured to the bracket 72 as at 76, the free end of the yoke being yieldably held upward by a spring 77 but arranged to be moved downwardly upon the downward movement of the punch plate by an adjustable stud 78 thereon provided for this purpose.

Secured to the top of the bracket 72 is a small bracket 81 which slidably carries one end of a pin 82, the other end being slidably received in a lateral recess in the bracket 72 which recess opens on the bore 73. A cross bar 83 is fixed to the pin 82 and a spring 84 carried on the pin between the cross bar and the bracket 81 serves to yieldably force the pin 82 in toward the bore 73 to prevent the passage of any springs 71 therethrough. A pair of spring fingers 85 fixed to the sides of the yoke 75 engage with the ends of the cross bar 83 and through the movement of the yoke control the position of pin 82.

Cooperating with the pin 82 is a second pin 86 which is also adapted to prevent movement of the valve springs 71 through the bore 73. A spring 87 secured to the bracket 72 and extending under the head of the pin 86 serves to normally hold it in its outward position. The yoke 75 is formed with a rib cam 88 which upon the tilting movement of the yoke engages with the head of the pin 86 and thus controls the position of the pin.

At the next station, D, a test is made to find out if both a foot 42 and a spring 71 are in each bushing, thus preventing the assembling of an incomplete valve. For this purpose, a yieldably mounted plunger 91 is provided on the punch plate which in the downward movement thereof is adapted to slide into the bushing 41. If either the spring or the foot is missing, a pin 92 secured to the plunger 91 is adapted to engage with a spring contact 93 to energize a solenoid and stop the apparatus so that the operator can insert the necessary part by hand.

Figures 10, 11:
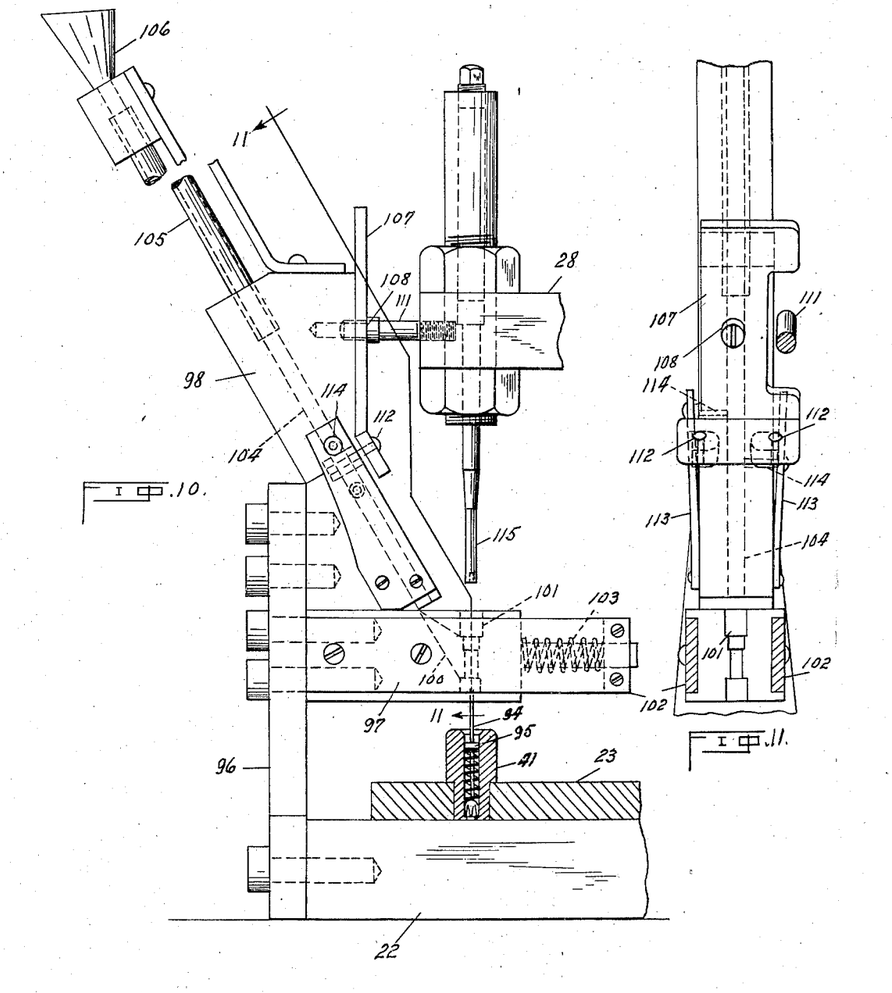
Figure 10 is a side elevation of the pin and cup feed unit labeled station E.
Figure 11 is an end view of Figure 10.

The valve center pin 94 with the cup 95 containing a washer already fixed thereto is inserted at the next station E by suitable mechanism such as indicated in Figures 10 and 11, wherein a side plate 96, secured to the bolster plate 22 carries a funnel block 97 and a feed block 98. The funnel block 97 is formed with a vertical bore 101 and the block is split on a plane through the axis of the bore, the one portion of the block being slidably carried on guide plates 102 and resiliently held against the fixed portion of the blocks by spring means 103. The stationary portion of the funnel block 97 is cut away adjacent the bore 101 as at 100.

The guide block 98 contains a longitudinal bore 104 which receives a feed tube 105 topped by a funnel 106. In order to feed the pin and cup assemblies through the bore 104 and to the funnel block 97 one at a time a U-shaped plate 107 is pivotally secured as at 108 to the guide block. A pin 111 fixed to the punch plate cooperates with the U-plate 107 to give a rocking movement thereto in the up and down movement of the punch plate as will be evident from Figure 11. Secured to the lower portion of the U plate 107 are two fingers 112 which are adapted to engage with the sides of either of a pair of spring arms 113 carrying pins 114 extending into the bore 104 at different points.

The punch plate 28 also carries a resilient plunger 115 in vertical alignment with the bore 101 which plunger insures that the pin and cup assembly will be moved down into the bushing 41.

Figure 12:
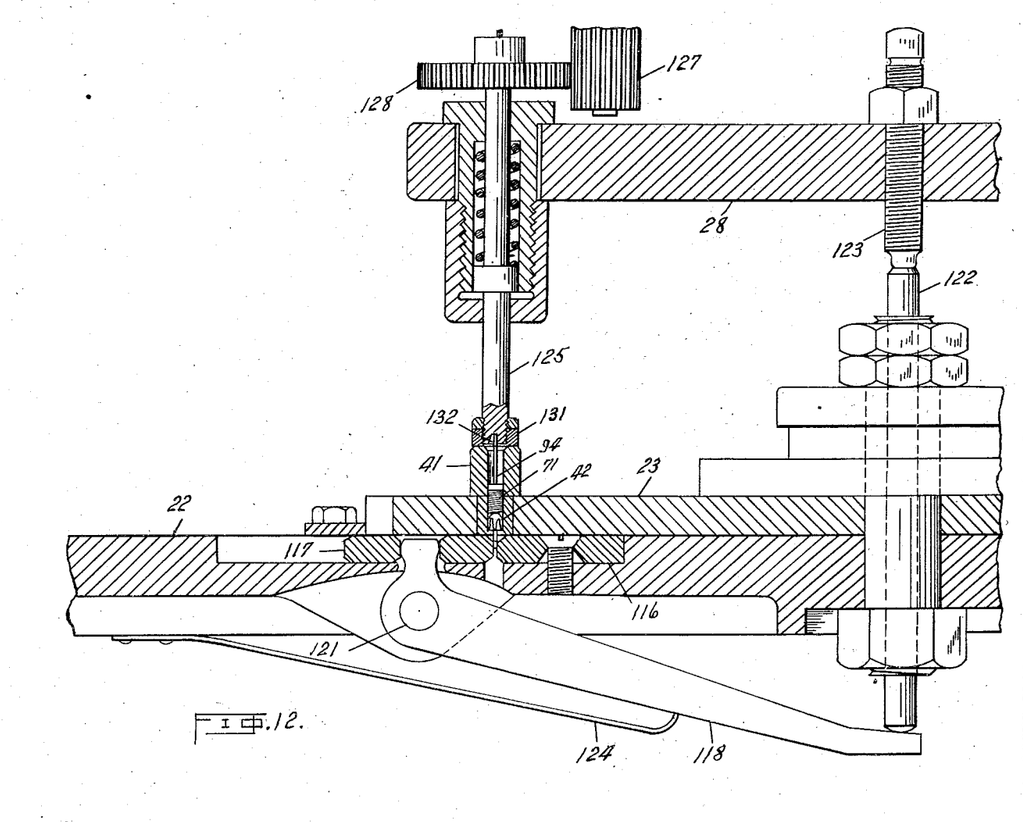
Figure 12 is a cross sectional elevation of the bottom flash-making unit labeled station F where the spring and cup are secured on the pin.

At the next station, F, (see Figure 12) the bottom or lower end of the valve center pin 94 is crimped or flashed, thus securing the foot 42 and spring 71 thereon. To this end a pair of cooperating flashing dies 116 and 117 may be carried in suitable recesses in the surface of the bolster plate 22 below the dial 23. The dial 116 is, in the embodiment shown, fixed, while the die 117 is moved toward and from it by a bell lever 118 pivoted as at 121 to the bolster plate. A rod 122 is vertically and slidably carried at the axis of the dial and engages at its lower end with the lever 118 and at its upper with an adjustable screw 123 carried by the punch plate. A spring 124 acting on the lever 118 serves to yieldably hold the dies in their open position. The pin 94 must be moved down through the relatively small hole in the foot and for this purpose, a resiliently positioned plunger 125 is mounted as shown in Figure 12 so that it may be rotated by a motor 126 through the agency of a long pinion 127 and a gear 128 secured to the end of the plunger. A nut 131 is adjustably mounted upon the lower end portion of the plunger 125, and a conical recess 132 is formed in the end of the latter, slightly eccentric of the axis thereof.

Figure 13:
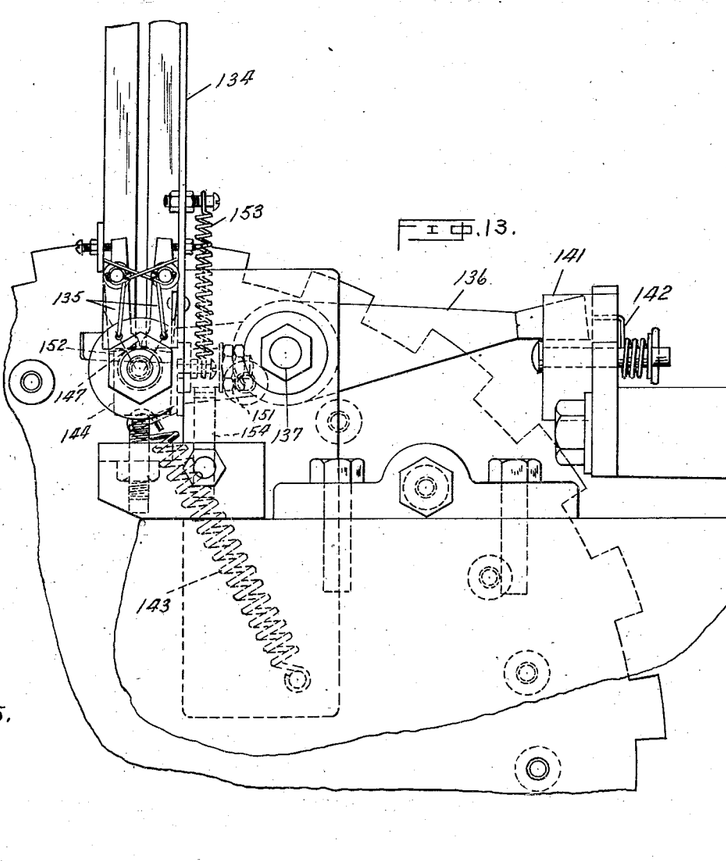
Figure 13 is a plan view of the barrel feed unit labeled station G.
Figure 14:
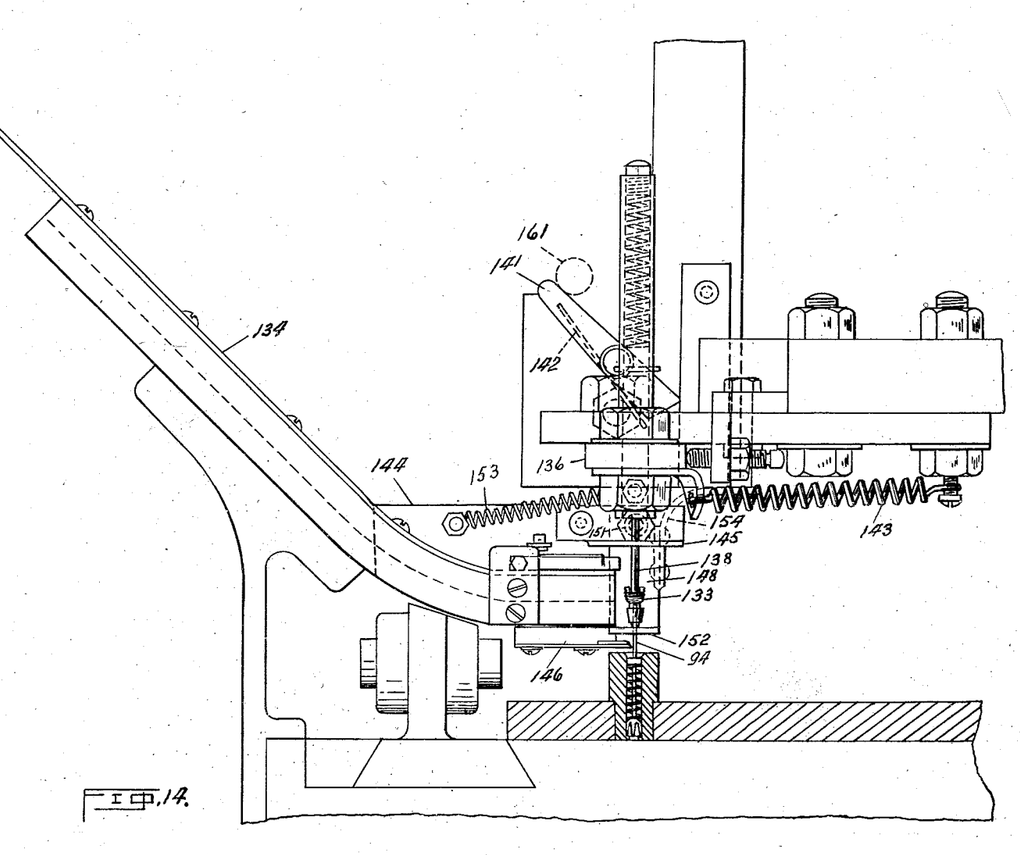
Figure 14 is an elevation of Figure 13.

Referring to Figures 13 and 14 illustrating station G, where the barrel assembly 133 is fed onto the pin, the numeral 134 indicates an inclined feed trough. A pair of fingers 135 which are urged inwardly by suitable spring means are provided at the end of the feed trough 134 and normally prevent movement outwardly of the barrel assemblies. A lever 136 pivoted at 137 to an extension of the punch plate 28 carries a yieldable plunger 138 at one end thereof and at the other end is formed round to cooperate in the up and down movement of the punch plate with a cam 141 pivotally secured to a fixed portion of frame 21 of the machine. A spring 142 serves to yieldably hold the cam 141 over as illustrated in Figure 14, while a spring 143 is provided between the end of the lever 136 and the punch plate to normally hold the lever over so that the resilient plunger 138 is in alignment with a bushing 41.

A plate 144 formed with a slotted horizontal bracket 145 may be attached to the side of the guide trough 134. In order to properly hold and center the valve pin 94 during the time the barrel assembly is placed thereover a plate 146 having angularly inclined sides 147 may be employed which cooperates with a plate 148 pivotally secured to the plate 144 at 151. The plate 148 is formed with a horizontal bracket 152 which is appropriately notched to engage with the sides 147 of the bottom plate 146, the valve pin 94 being clamped at the vertex of the angle. A spring 153 serves to normally hold the plate 148 and the horizontal bracket 152 in a raised inoperative position while a finger 154 secured to the plate 148 is adapted to contact with a suitable adjustable stop on the punch plate in the downward movement thereof to swing the plate 148 and bracket 152 down into clamping engagement with the valve pin.

Figure 15:
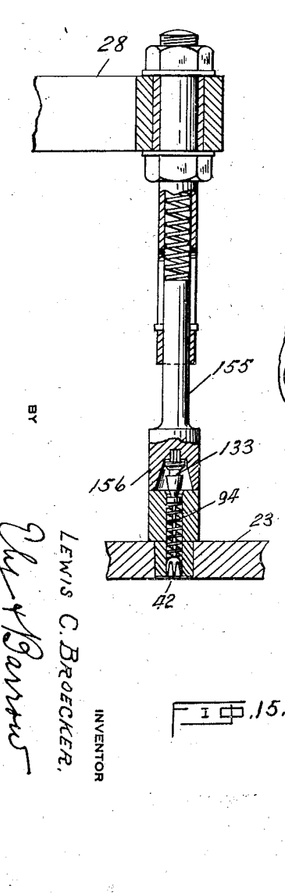
Figure 15 is a sectional view of the barrel pusher unit labeled station H.

At station H, shown in Figure 15, a resilient plunger 155, mounted on the punch plate 28, is formed with a recessed cap 156 which is adapted to engage with the barrel assembly 133 and push it down over the valve pin 94.

Figure 16:
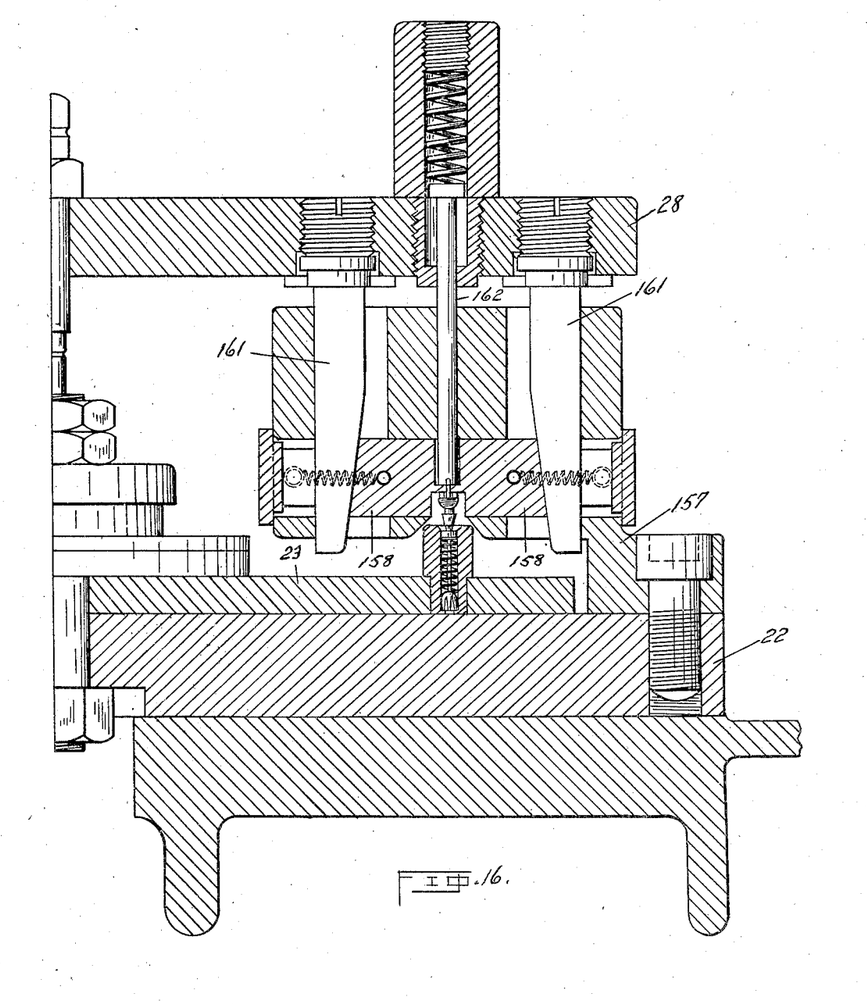
Figure 16 is a sectional view of the top flash or crimping unit labeled station J.

The final station J, Figure 16, is where the top flash or crimp is made on the valve pin 94 which serves to hold the barrel assembly 133 thereon. Suitable means for this purpose may include a bracket block 157 secured to the bolster plate 22 and extending out over the dial 23. The bracket block 157 will serve to slidably carry a pair of dies 158 which are operated by a pair of cam rods 161 adjustably secured to the punch plate 28. In order to properly hold and center the valve pin 94 during the crimping operation the punch plate 28 may carry a resilient plunger 162 which slides in a vertical hole in the bracket block 157 and which is formed with a recess at the end thereof in which the pin is received. At 165 is indicated a funnel discharge pipe leading to a suitable receptacle into which pipe the completed valve insides may be blown by a jet of compressed air.

The operation of the apparatus is as follows: All of the magazines and feeds for the various valve parts are first filled and then the motors 24 and 126 are started which will reciprocate the punch plate 28 up and down as well as stepping the dial 23 in timed relation therewith.

A foot 42 is fed into each bushing 41 at station A. The feet slide by gravity from the pipe 47 through hole 48 into the funnel hole 51 in the pivoted carrier plate 52. In the downward movement of the punch plate the cam 57 contacts with the follower 55 to turn post 54 and carrier plate 52 so that the hole 51 in the carrier plate is moved into engagement with the funnel hole 45 in the plate 44 which allows the foot to drop through into the bushing 41. To insure that the holes 51 and 45 stay in alignment a sufficient time to properly discharge the foot, the resilient pin 61 carried on the cam 57 will give in the downward movement of the punch plate so that it sinks into the surface 58 of the cam and does not interfere with the normal cam action, however, as soon as the follower 55 has been moved over by the pin 61 it will spring out and prevent the return movement of the follower and thus the carrier plate until the punch plate 28 raises so that the cam 57 and pin 61 are moved clear from the follower at which time the spring 56 will swing the carrier plate back to the loading position.

The movement of the carrier plate 52 controls the feeding of the feet one at a time as the pin 66 secured to the carrier plate hits the end 67 of the knife 63 in the outward movement of the carrier to move the knife out of the passage 48, thus allowing a foot to drop down in the passage below the knife.

As the punch plate 28 raises, the dial 23 and bushing 41 will be stepped to station B by the reciprocation of the slide 36 and the action of the dog 37 so that in the next downward movement of the punch plate the resilient plunger 68 will enter the bushing 41 and insure that the foot is at the bottom thereof.

The dial is now stepped to station C where a spring 71 is fed into the bushing. Referring to Figure 7, the relation of the apparatus is such that either pin 82 or 86 extends into the vertical bore 73 and the position of the pins is controlled by the pivoted yoke 75. Thus in the upward movement of punch plate 28 the spring 77 rocks the yoke so that the fingers 85 thereon push the cross-bar 83 and pin 82 back against the action of spring 84 which will move the pin 82 out of the bore 73 allowing a valve spring to fall down against pin 86.

In the downward movement of the punch plate the stop 78 hits the yoke to tip it in the opposite direction which not only causes the pin 82 to again enter the bore 73 under the action of the spring 84 but also causes the rib 88 on the back inside of the yoke to move away from the pin 86 so that the spring 87 will move the pin out of the bore 73 allowing the valve spring to drop down into the bushing on top of the foot.

The dial is now stepped to station D, Figure 9, where the resilient plunger 91 tests to see if both a foot and valve spring are in the bushing. If either is missing the pin 92 will contact with the spring contact 93 which will complete the circuit to a solenoid which will stop the motor 24 and allow the operator to put the missing part in by hand thus preventing the assembling of incomplete valves.

At the next station, E, the pin and cup assembly is inserted in the bushing. The up and down movement of the punch plate 28 acting through pin 111 rocks the U-plate 107 which through fingers 112 will move pins 114 alternately into and out of the bore 104. As the pins 114 enter the bore at different points therein this action will feed the pin and cup assemblies therethrough one at a time.

The pin and cup assemblies after leaving the feeding mechanism will slide by gravity down into the bore 101 of the split block 97. The resilient plunger 115 will serve to assist in moving the pin and cup assembly into the bushing, the split block yielding against spring 103 if necessary.

The bushing and dial are next stepped to station F where the rotating resilient plunger 125 in the downward movement of the punch plate engages with the end of the valve center pin 94 and moves it down through the foot 42 so that the lower end of the pin extends below the dial and between the dies 116 and 117. The eccentricity of the hole 132 gives the lower end of the pin a wobble so that the pin will find and go through the relatively small hole in the foot more readily. Further downward movement of the punch plate will rock bell lever 118 through pin 122 to crimp an ear or flat on the end of the center pin which will prevent the foot 42 and spring 71 from sliding off the pin.

The dial will now be stepped to station G seen in Figures 13 and 14 where a barrel assembly 133 is placed over the center pin. In the downward movement of the punch plate 28 the round end of the lever 136 engages with the cam 141 as shown by the dotted circle 166 so that the lever is rocked about its pivot 137 against the action of the spring 143 which will bring the resilient plunger 138 into vertical alignment with the barrel assembly carried in the feed trough 134 which is just behind the shoulders on the fingers 135. At this time the round end of the lever 136 will pass the pivotal support for the cam 141 which will then tip to a vertical position so that further downward movement of the punch plate will carry the tapered end of the plunger 138 into the bore of the barrel assembly.

As the punch plate almost completes its downward travel the round end of the lever 136 will ride off the lower end of the cam 141 at which time the spring 142 will cause the cam to return to the position shown in Figure 14. As soon as the lever 136 clears the cam 141 the spring 143 will cause the lever to rock back and bring the plunger 138 into alignment with the bushing 41, the plunger 138 pulling the barrel assembly (into which it extends) past the fingers 135 and depositing it over the valve center pin.

In the meantime the center pin has been supported and strengthened by the plate 148 and notched bracket 152 clamping the pin against the plate 146 which action occurs when the punch plate hits the finger 154 secured to the plate 148 which swings it about its pivot 151 against the action of the spring 153.

In the upward movement of the punch plate the spring 143 keeps the lever 136 over so that the round end thereof does not engage with the cam 141 until near the end of the upward travel it tips the cam up against the action of the spring 142, the cam clicking back under the round portion of the lever to bring the parts back to their initial position.

Referring to Figure 15 the dial is stepped to bring the bushing to station H where the plunger 155 and cup 156 insure that the barrel is moved down over the pin.

The dial is next stepped to station J where in the downward movement of the punch plate the cam rods 161 secured thereto move the dies 158 together to crimp flats or ears on the valve center pin slightly below the end thereof over which the barrel assembly cannot slide.

After leaving station J the completed valve is blown out of its bushing 41 by a jet of compressed air into the discharge pipe 165.

For the sake of clearness, only the assembling of one valve inside has been explained but it will be understood that all the operations will be going on at the various stations at the same time so that upon each step of the dial the bushings 41 will move one step and a completed valve will be discharged.

As many changes could be made in this construction, it is intended that all matter contained in the above description or shown in the accompanying drawings shall be interpreted as illustrative only and not in a limiting sense, accordingly various modifications of the invention can be resorted to without departing from the spirit of the invention or the scope of the appended claims.

What is claimed is:

1. In a valve parts assembling machine, a punch plate and a rotatably-mounted dial, means for reciprocating said punch plate toward and from said dial, means synchronized with said reciprocating means for indexing said dial when said punch plate is spaced therefrom, an annular series of spaced bushings carried on said dial, means for feeding a valve foot into said bushings at one station, means for feeding a spring into said bushings at a second station, testing means at a third station to determine whether the foot and spring have been placed in each bushing, means for feeding a valve cup and pin assembly to each bushing at a fourth station, means for pushing the pin through said spring and said foot at a fifth station, means for pressing a flat on the lower end of the pin to secure the foot and spring thereon, means to feed a barrel assembly over the top of each pin at a sixth station, means at a seventh station for pressing ears on the upper portion of each pin to hold the barrel assembly thereon, and means for discharging the completed valve assemblies.

2. In a valve parts assembly machine, a punch plate and a rotatably-mounted dial, means for reciprocating said punch plate toward and from said dial, means synchronized with said reciprocating means for indexing said dial when said punch plate is spaced therefrom, an annular series of spaced bushings carried on said dial, means for feeding a valve foot into said bushings, means for feeding a spring into said bushings, testing means to determine whether the foot and spring have been placed in each bushing, means for feeding a valve cup and pin assembly to each bushing, means for pushing the pin through said spring and said foot, means for pressing a flat on the lower end of the pin to secure the foot and spring thereon, means to feed a barrel assembly over the top of each pin, means for pressing ears on the upper portion of each pin to hold the barrel assembly thereon, and means for discharging the completed valve assemblies.

3. In a valve parts assembling machine, a punch plate and a rotatably-mounted dial, means for reciprocating said punch plate toward and from said dial, means synchronized with said reciprocating means for indexing said dial when said punch plate is spaced therefrom, an annular series of spaced bushings carried on said dial, means for feeding a valve foot into said bushings, means for feeding a spring into said bushings, means for feeding a valve cup and pin assembly to each bushing, means for pushing the pin through said spring and said foot, means for pressing a flat on the lower end of the pin to secure the foot and spring thereon, means to feed a barrel assembly over the top of each pin, means for pressing ears on the upper portion of each pin to hold the barrel assembly thereon, and means for discharging the completed valve assemblies.

4. In a valve parts assembling machine, a punch plate and a rotatably-mounted dial, means for reciprocating said punch plate toward and from said dial, means synchronized with said reciprocating means for indexing said dial when said punch plate is spaced therefrom, an annular series of spaced bushings carried on said dial, means for feeding a valve foot into said bushings, means for feeding a spring into said bushings, means for feeding a valve cup and pin assembly to each bushing, means for pushing the pin through said spring and said foot, means for pressing a flat on the lower end of the pin to secure the foot and spring thereon, means to feed a barrel assembly over the top of each pin, and means for pressing ears on the upper portion of each pin to hold the barrel assembly thereon.

5. In a valve parts assembling machine, a work holder comprising a bushing, means for feeding a valve foot into said bushing at one station, means for feeding a spring into said bushing at a second station, testing means at a third station to determine whether the foot and spring have been placed in the bushing, means for feeding a valve cup and pin assembly to the bushing at a fourth station, means for pushing the pin through said spring and said foot at a fifth station, means for pressing a flat on the lower end of the pin to secure the foot and spring thereon, means to feed a barrel assembly over the top of each pin at a sixth station, means at a seventh station for pressing ears on the upper portion of each pin to hold the barel assembly thereon, and means for discharging the completed valve assemblies.

6. In a valve parts assembling machine, a work holder comprising a bushing, means for successively operatively associating said bushing with mechanisms comprising means for feeding a valve foot into said bushing, means for feeding a spring into said bushing, testing means to determine whether the foot and spring have been placed in the bushing, means for feeding a valve cup and pin assembly to the bushing, means for pushing the pin through said spring and said foot, means for pressing a flat on the lower end of the pin to secure the foot and spring thereon, means to feed a barrel assembly over the top of each pin, means for pressing ears on the upper portion of each pin to hold the barrel assembly thereon, and means for discharging the completed valve assemblies.

7. In a valve parts assembling machine, a work holder comprising a bushing, and means for successively presenting the same to a series of mechanisms comprising means for feeding a valve foot into said bushing, means for feeding a spring into said bushing, means for feeding a valve cup and pin assembly to the bushing, means for pushing the pin through said spring and said foot, means for pressing a flat on the lower end of the pin to secure the foot and spring thereon, means to feed a barrel assembly over the top of each pin, means for pressing ears on the upper portion of each pin to hold the barrel assembly thereon, and means for discharging the completed valve assemblies from the bushing.

8. In a valve parts assembling machine, a punch plate, a work holder comprising a bushing, means for reciprocating said punch plate toward and from said bushing, a foot feeding mechanism and means synchronized with said punch plate reciprocating means for moving said bushing adjacent the foot feeding mechanism, said mechanism including a magazine for said feet, a funnel plate having a hole in alignment with the bushing, a pivoted carrier plate having a hole therethrough, a cam on said punch plate adapted to move said carrier plate so that the hole therein will swing from the magazine to alignment with the hole in the funnel plate, means for feeding the feet to said carrier plate one at a time, and means for maintaining the holes in the carrier and funnel plates in alignment during a portion of the upward stroke of said punch plate.

9. In a valve parts assembling machine, a punch plate, a work holder comprising a bushing, means for reciprocating said punch plate toward and from said bushing, a foot feeding mechanism and means synchronized with said punch plate reciprocating means for moving said bushing adjacent the foot feeding mechanism, said mechanism including a magazine for said feet, a funnel plate having a hole in alignment with the bushing, a pivoted carrier plate having a hole therethrough, a cam on said punch plate adapted to move said carrier plate so that the hole therein will swing from the magazine to alignment with the hole in the funnel plate, and means for feeding the feet to said carrier plate one at a time.

10. In a valve parts assembling machine, a punch plate, a work holder comprising a bushing, means for reciprocating said punch plate toward and from said bushing, a feeding mechanism and means synchronized with said punch plate reciprocating means for moving said bushing adjacent the feeding mechanism, said mechanism including a magazine, a funnel plate having a hole in alignment with the bushing, a pivoted carrier plate having a hole therethrough, a cam on said punch plate adapted to move said carrier plate so that the hole therein will swing from the magazine to alignment with the hole in the funnel plate, and means for feeding the valve parts to said carrier plate one at a time.

11. In a valve parts assembling machine, a punch plate, a work holder comprising a bushing, means for reciprocating said punch plate toward and from said bushing, a spring feeding mechanism and means synchronized with said punch plate reciprocating means for moving said bushing adjacent the spring feeding mechanism, said spring feeding mechanism including a bracket having a vertical bore in alignment with the bushing, a magazine removably carried in the top of said bore, a pair of stop pins adapted to be moved into the bore at different places in its length, means pivoted on said bracket for controlling the position of the pins so that when one is out of the bore the other is in, and means on said punch plate for controlling the position of said pivoted means, whereby upon each rocking movement given the pivoted means a single spring is fed to the bushing.

12. In a valve parts assembling machine, a punch plate, a work holder comprising a bushing, means for reciprocating said punch plate toward and from said bushing, a spring feeding mechanism and means synchronized with said punch plate reciprocating means for moving said bushing adjacent the spring feeding mechanism, said spring feeding mechanism including a bracket having a vertical bore in alignment with the bushing, a magazine removably carried in the top of said bore, and means controlled by the punch plate for feeding said springs through said bore one at a time.

13. In a valve parts assembling machine, a punch plate, a work holder comprising a bushing, means for reciprocating said punch plate toward and from said bushing, a feeding mechanism and means synchronized with said punch plate reciprocating means for moving said bushing adjacent the feeding mechanism, said feeding mechanism including a bracket having a vertical bore in alignment with the bushing, a magazine removably carried in the top of said bore, a pair of stop pins adapted to be moved into the bore at different places in its length, and means for controlling the position of the pins so that when one is out of the bore the other is in.

14. In a valve parts assembling machine, a punch plate, a work holder comprising a bushing, means for reciprocating said punch plate towards and from said bushing, a pin and cup assembly feeding mechanism, means synchronized with said punch plate reciprocating means for moving said bushing adjacent the pin and cup feeding mechanism, said mechanism including a split block having a vertical bore in alignment with the bushing in its position adjacent the mechanism, an inclined block having a passage therethrough in register with the vertical bore in the first-named block, a pair of pins entering the passage, a plate pivotally secured to said inclined block, means connecting said pins and plate so that oscillation of the plate about its pivot will alternately move one pin into and one out of the passage, whereby the pin and cup assemblies are fed one at a time to the vertical bore of the first-named block, means on said punch for oscillating said pivoted plate in the up and down movement of the punch plate, and a resilient plunger mounted on said punch plate in alignment with the vertical bore in said block.

15. In a valve parts assembling machine, a punch plate, a work holder comprising a bushing, means for reciprocating said punch plate towards and from said bushing, a pin and cup assembly feeding mechanism, means synchronized with said punch plate reciprocating means for moving said bushing adjacent the pin and cup feeding mechanism, said mechanism including a block having a passage therethrough, a pair of pins entering the passage, a plate pivotally secured to said inclined block, means connecting said pins and plate so that oscillation of the plate about its pivot will alternately move one pin into and out of the passage, and means on said punch for oscillating said pivoted plate in the up and down movement of the punch plate.

16. In a valve parts assembling machine, a bushing constituting a work holder adapted to receive a foot, spring and a pin and cup assembly, a resilient plunger having an eccentric recess in the end thereof, means for rotating said plunger, means for reciprocating said rotating plunger toward and from said bushing, whereby the pin will be moved through the hole in the foot, crimping dies below said bushing, and means for operating said dies actuated by the final movement of the plunger toward the bushing.

17. In a valve parts assembling machine, a bushing constituting a work holder adapted to contain a pin and cup assembly, a punch plate, means for reciprocating said punch plate to and from said bushing, mechanism for feeding a barrel assembly over the pin in the bushing, means for moving said bushing adjacent said barrel feeding mechanism in timed relation with said punch plate reciprocating means, said barrel feeding mechanism including a lever pivoted to said punch plate for horizontal movement, a resilient plunger carried on the forward end of said lever for movement into vertical alignment with the bushing, a cam having a fixed pivotal support controlling the angular position of said lever, a feed trough for the barrel assemblies, said resilient plunger being adapted to move a barrel assembly from the feed trough over the pin in the bushing during the downward movement of the punch plate, and pin clamping and steadying means adapted to be moved against the pin in the downward movement of the punch plate.

18. In a valve parts assembling machine, a bushing constituting a work holder adapted to contain a pin and cup assembly, a punch plate, means for reciprocating said punch plate to and from said bushing, mechanism for feeding a barrel assembly over the pin in the bushing, said barrel feeding mechanism including a lever pivoted to said punch plate, a resilient plunger carried on the forward end of said lever for movement into vertical alignment with the bushing, a cam having a fixed support controlling the angular position of said lever, and a feed trough for the barrel assemblies, said resilient plunger being adapted to move a barrel assembly from the feed trough over the pin in the bushing during the downward movement of the punch plate.

19. In a valve parts assembling machine, a bushing constituting a work holder, a punch plate, means for reciprocating said punch plate toward and from said bushing, a bracket block over said bushing, a pair of crimping dies slidably carried in said block, and a pair of cam rods mounted on said punch plate to cooperate with said dies, whereby upon the downward movement of the punch plate the dies will be moved into crimping position.

20. In a valve parts assembling machine, a bushing constituting a work holder adapted to carry a pin and cup assembly with a barrel assembly over the pin, a punch plate, means for reciprocating said punch plate toward and from said bushing, a bracket block over said bushing, a pair of crimping dies slidably carried in said block, a pair of cam rods mounted on said punch plate to cooperate with said dies, whereby upon the downward movement of the punch plate the dies will crimp ears on the pin near the top thereof to hold the barrel assembly thereon, and means for centering and steadying the pin during the crimping operation.

LEWIS C. BROECKER.